United States Patent
Rothe

(10) Patent No.: US 9,644,578 B2
(45) Date of Patent: May 9, 2017

(54) PROPULSION DEVICE AND METHOD FOR OPERATING SAME USING A PARTIALLY OXIDIZED DIESEL FUEL

(71) Applicant: MAN Truck & Bus AG, Munich (DE)

(72) Inventor: Dieter Rothe, Nuremberg (DE)

(73) Assignee: MAN TRUCK & BUS AG, Munich (DE)

(*) Notice: Subject to any disclaimer, the term of this patent is extended or adjusted under 35 U.S.C. 154(b) by 345 days.

(21) Appl. No.: 14/273,095

(22) Filed: May 8, 2014

(65) Prior Publication Data
US 2014/0338638 A1    Nov. 20, 2014

(30) Foreign Application Priority Data
May 16, 2013   (DE) ........................ 10 2013 008 367

(51) Int. Cl.
| | |
|---|---|
| *F02M 27/02* | (2006.01) |
| *F02B 51/02* | (2006.01) |
| *F02M 25/10* | (2006.01) |
| *F02B 49/00* | (2006.01) |
| *F02B 45/06* | (2006.01) |
| *F02M 27/04* | (2006.01) |
| *F02D 19/06* | (2006.01) |
| *F02B 3/06* | (2006.01) |

(52) U.S. Cl.
CPC ............ *F02M 25/10* (2013.01); *F02B 45/06* (2013.01); *F02B 49/00* (2013.01); *F02B 51/02* (2013.01); *F02D 19/0671* (2013.01); *F02M 27/02* (2013.01); *F02M 27/042* (2013.01); *F02B 3/06* (2013.01); *F02M 2200/95* (2013.01); *Y02T 10/126* (2013.01); *Y02T 10/36* (2013.01)

(58) Field of Classification Search
CPC ........ F02M 25/10; F02M 27/02; F02M 27/08; F02M 27/042; F02B 45/06; F02B 45/04; F02B 51/02; F02B 49/00; F02D 19/0671; F02D 19/0649; F02D 19/08; F02D 19/081
USPC ........... 123/445, 3, 1 A, 536, 538, 567, 585, 123/27 GE; 60/304, 306
See application file for complete search history.

(56) References Cited

U.S. PATENT DOCUMENTS

| | | | | |
|---|---|---|---|---|
| 4,002,151 A | * | 1/1977 | Toyoda ................. | F02M 27/02 123/1 A |
| 4,170,200 A | * | 10/1979 | Takeuchi ............... | F02M 27/02 123/1 A |
| 4,750,453 A | * | 6/1988 | Valdespino ............ | F02B 43/10 123/1 A |
| 5,771,847 A | * | 6/1998 | Duva ..................... | F02B 45/06 123/1 A |
| 6,155,212 A | * | 12/2000 | McAlister .............. | F02B 43/08 123/25 B |

(Continued)

*Primary Examiner* — Thomas Moulis
*Assistant Examiner* — George Jin
(74) *Attorney, Agent, or Firm* — Lucas & Mercanti, LLP

(57) ABSTRACT

A propulsion device for vehicles includes a device for the partial oxidation of fuel, a fuel tank and a diesel internal combustion engine. The device for the partial oxidation of fuel is in fluid connection with the fuel tank and the diesel internal combustion engine, with the result that at least some of the fuel carried in the vehicle is taken for partial oxidation before combustion in the diesel internal combustion engine. A method for operating such propulsion devices using partially oxidized fuel in the propulsion devices reduces soot emissions.

24 Claims, 2 Drawing Sheets

(56) References Cited

U.S. PATENT DOCUMENTS

| | | | |
|---|---|---|---|
| 6,981,472 B2 * | 1/2006 | Bromberg | B01J 19/0006 |
| | | | 123/27 GE |
| 7,188,587 B1 * | 3/2007 | Quader | B60W 10/06 |
| | | | 123/26 |
| 7,683,232 B2 * | 3/2010 | Schmidt | C01B 3/323 |
| | | | 423/648.1 |
| 2008/0257301 A1 * | 10/2008 | Hotta | C01B 3/26 |
| | | | 123/253 |
| 2009/0031968 A1 * | 2/2009 | Cracknell | C01B 3/386 |
| | | | 123/3 |
| 2011/0239973 A1 * | 10/2011 | Qin | C10L 1/02 |
| | | | 123/1 A |
| 2011/0277734 A1 * | 11/2011 | McCann | F02M 26/36 |
| | | | 123/585 |
| 2013/0236370 A1 * | 9/2013 | Maslov | B01J 7/00 |
| | | | 422/198 |
| 2015/0330299 A1 * | 11/2015 | Koseki | F02M 25/00 |
| | | | 123/1 A |

* cited by examiner

PROPULSION DEVICE AND METHOD FOR OPERATING SAME USING A PARTIALLY OXIDIZED DIESEL FUEL

CROSS-REFERENCE TO RELATED APPLICATIONS

This application claims the priority of DE 10 2013 008 367.2 filed May 16, 2013, which is incorporated by reference herein.

BACKGROUND OF THE INVENTION

The present invention relates to a propulsion device for vehicles based on a diesel internal combustion engine, in which a fuel to be burnt is initially partially oxidized and then burnt as a mixture with the unoxidized fuel in the diesel internal combustion engine. The present invention furthermore relates to a method for operating a diesel internal combustion engine using an at least partially oxidized diesel fuel and to the use of a partially oxidized diesel fuel to reduce soot emissions in the above-described propulsion device.

Strategies for reducing soot emissions in diesel vehicles, especially fine soot particles, are currently the subject of intensive research. Not least of the reasons for this are the Euro V and Euro VI exhaust standards, which require significant reductions in soot emissions.

One starting point for reducing soot particle emissions which has established itself in connection with diesel vehicles in the last few years, and was stipulated by the Euro VI standard, is the use of diesel particle filters. Here, diesel soot particles are collected in a filter system and are then converted to gaseous decomposition products (substantially $CO_2$) by heating to a temperature above 250° C. Filtering the particulate exhaust gas constituents is not the actual problem. It is rather the regeneration of this diesel particle filter as completely as possible, in which the soot particles collected must be broken down into gaseous decomposition products.

In the case of regeneration, a distinction is drawn between passive continuous regeneration and active discontinuous regeneration. Passive continuous regeneration takes place at a temperature above 250° C. and preferably involves $NO_2$ formed over an oxidation catalyst in accordance with the reaction formula $$2NO_2 + C \rightarrow CO_2 + 2NO.$$

In addition, discontinuous active regeneration, preferably with oxygen at a temperature of more than 450° C., must take place at least at certain intervals in accordance with the reaction formulae shown below.

$$C + O_2 \rightarrow CO_2$$

$$2C + O_2 \rightarrow 2CO.$$

For active regeneration with oxygen, it is generally necessary to raise the exhaust gas temperature. This can be accomplished by measures applied to the engine, such as intake air throttling, or afterinjection and measures downstream of the engine, such as a burner, external fuel metering or external heated catalyzers. However, there is the problem with measures applied to the engine and downstream of the engine that the particle filter has to be heated to a high temperature for active combustion, to achieve which the vehicle must be driven for a certain distance. If vehicles are not driven over relatively long distances, unburnt soot residues in the filter can lead to problems, especially blockage of the filter. Moreover, measures downstream of the engine are often associated with an increased energy requirement, resulting in higher fuel consumption by the vehicles.

These problems have led to an increasing search for approaches with which it is possible to suppress the formation of soot in diesel engines a priori.

A relevant approach described in EP 0 590 914 consists in mixing an additive into the fuel from an additional tank before combustion. This additive lowers the burn-off temperature of the soot particles in the particle filter and thus facilitates the combustion thereof.

In addition, it is possible to use oxygen-containing "fuel additives" to lower the regeneration temperature. The addition of fuel additives is described in DE 10 2009 035 503 A1 or DE 10 2008 032 254 B4, for example. In US 2006/180099 A1 or WO 2011/126653 A1, oxygen-containing constituents, such as ethanol, are added to the diesel fuel, in which the ethanol contained in the fuel is subjected to acid-catalyzed dehydration before combustion. The diethyl ether thereby formed has significantly better combustion properties than ethanol, and therefore the combustion process can be controlled with the aid of the generation of the ether. However, one problem associated with adding ethanol to diesel fuel is that the two constituents can dissociate in the tank, making it necessary to add further additives to stabilize the mixture. These, in turn, require expensive production and distribution, leading to considerable additional costs for the fuel.

An alternative approach is followed by Bromberg, L. et al. in his contribution entitled "*On-Board Plasmatron Generation of Hydrogen Rich Gas for Diesel Engine Exhaust Aftertreatment and Other Applications*", PSFC JA-02-30, of 11 Dec. 2002. In this approach, a plasmatron reformer is used to convert diesel fuel or bio oils into a hydrogen-rich gas. Diesel plasmatron reformer technology is capable of converting significant amounts of fuel into hydrogen without the need for a catalyst. This is achieved through the use of a special plasma for the non-catalytic conversion of the diesel fuel into hydrogen, with the hydrogen yields being sufficient to produce an $NO_X$ trap.

The conversion of fuel by means of a plasma was also described in EP 1 891 309 B1, in which some of the fuel carried in the vehicle was subjected to treatment with an ozone-containing air plasma. For this purpose, the volatile constituents of the diesel were evaporated by introducing a gas and made to react with the ozone. The decomposition products from the diesel which were formed in this reaction were then passed into the exhaust gas flow in order to facilitate the afterburning of the soot particles there.

DE 103 59 395 A1 also describes afterburning of fuel residues after they leave the combustion chamber, in which a reducing gas, such as hydrogen, carbon monoxide, ammonia or hydrocarbons or mixtures thereof, is introduced into the exhaust gas flow. For this purpose, the reducing gas is first of all produced by means of an "on-board" reactor from the fuel being carried, wherein the reactor is designed in such a way that a reforming-splitting or a cracking process occurs. By means of this process, some of the fuel is converted into said reducing agents, which are then introduced into the exhaust line for reductive ash decomposition.

However, one disadvantage of measures which start after the actual decomposition of the fuel is that the amount of soot which is originally formed is not affected, i.e. that combustion itself cannot be improved. However, exhaust gas aftertreatment is always less advantageous in terms of energy than control of combustion in such a way that the amount of soot which then has to be burnt at additional expense is less.

Finally, DE 23 65 255 discloses a method for reducing nitrogen oxide emissions from petroleum combustion processes, wherein some of the fuel to be fed to the internal combustion engine is converted into decomposition and oxidation products, such as aldehydes and ketones, carbon monoxide, hydrogen and short-chain hydrocarbons in a reformer and is then fed to an internal combustion engine. In this case, the mixture supplied is introduced into the combustion chamber of the engine particularly in the region of the spark plug and serves as a highly combustible charge ("rich mixture"). This mixture is ignited by the spark plugs, from where combustion propagates to the remainder of the fuel mixture ("lean mixture"). However, DE 23 65 255 relates essentially to conventional spark ignition engines and to the reduction of nitrogen oxide emissions.

BRIEF SUMMARY OF THE INVENTION

Despite the progress that has already been made, there is a need for methods and devices by means of which the formation of soot particles from fuel constituents can be suppressed or at least reduced in order in this way to prevent a disadvantageous accumulation of soot in a downstream diesel soot particle filter. The present invention is concerned with these problems.

BRIEF DESCRIPTION OF THE DRAWINGS

An illustrative embodiment of the present invention is shown by way of example in FIG. 1, wherein the fuel is taken from the fuel tank (1) and fed to a reformer (2). In the reformer, the hydrocarbons in the fuel are oxidized to give oxygen-containing hydrocarbons. These partially oxidized hydrocarbons are less stable to storage than the original hydrocarbons and are mixed with the original fuel in a mixer unit (3) and then fed for combustion in the diesel internal combustion engine (4) via the fuel path.

DESCRIPTION OF THE INVENTION

Figure 1:
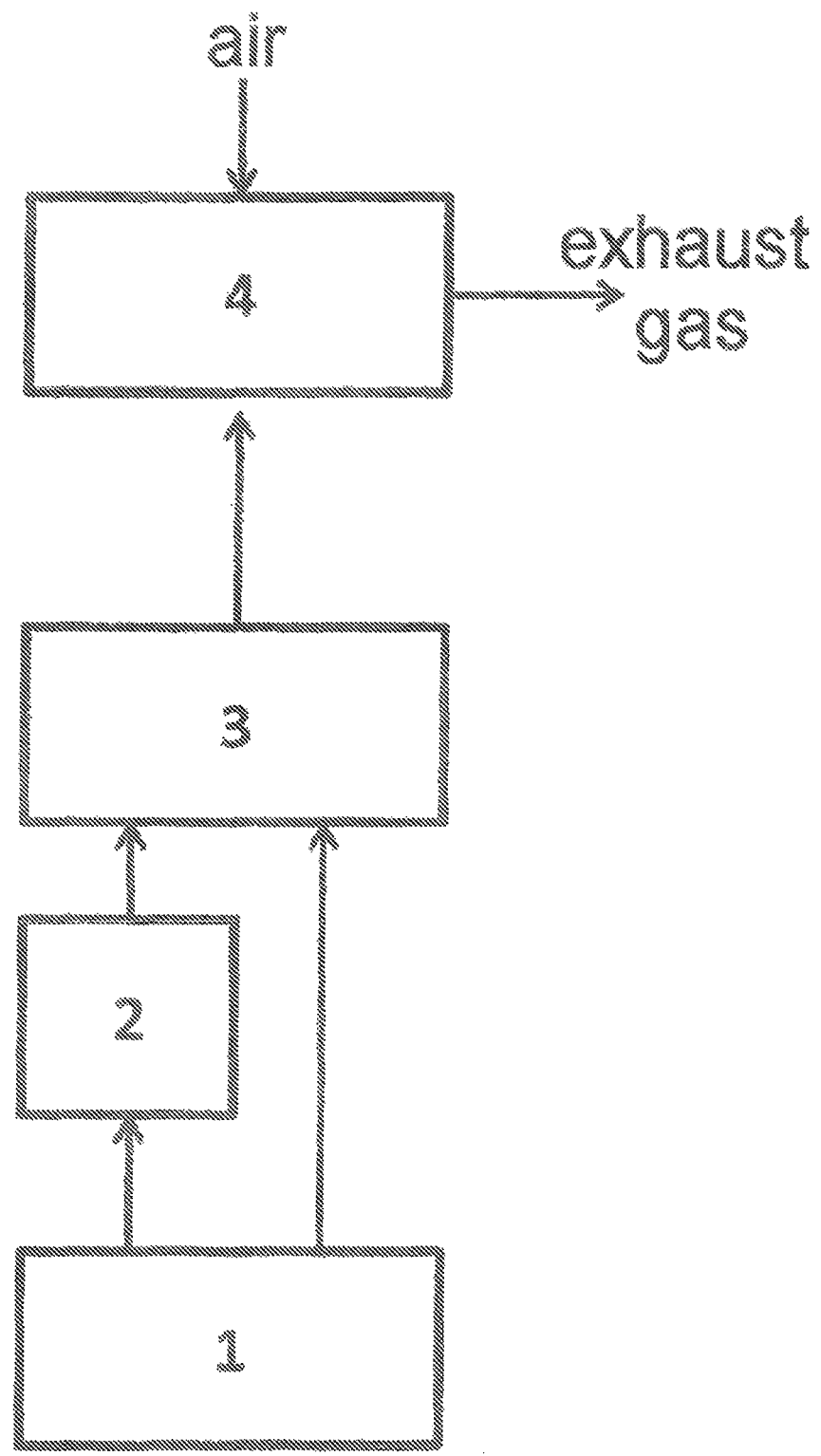

It is the aim of the present invention to make available a device in which the formation of soot particles during the combustion process is suppressed as far as possible. Another aim of the present invention consists in modifying the soot particles formed, even as they are formed, in such a way that they can be broken down more easily and with less expenditure of energy in a subsequent soot particle filter than is the case with soot particles from conventional propulsion devices. Another aim of the present invention consists as far as possible in not admixing an additional constituent to the diesel fuel since this is associated with the production and distribution of such additives (e.g. methanol, ethanol or similar) at increased cost. The provision of devices by means of which a fuel can be modified "on board", i.e. in a moving vehicle, in such a way that it satisfies the existing requirements is therefore a significant aim of the present invention.

A first aspect of the present invention accordingly relates to a propulsion device for vehicles, comprising a device for the partial oxidation of fuel (2), a fuel tank (1) and a diesel internal combustion engine (4), wherein the propulsion device is characterized in that the device for the partial oxidation of fuel (2) is in fluid connection with the fuel tank (1) and the diesel internal combustion engine (4), with the result that at least some of the fuel carried in the vehicle can be taken for partial oxidation before combustion in the diesel internal combustion engine.

"Some" of the fuel is intended to mean that not all the fuel is passed to the diesel internal combustion engine via the device for the partial oxidation of fuel. Preferably, only 50% by volume or less, in particular 30% by volume or less, and particularly preferably 15% by volume or less, of the fuel introduced into the diesel internal combustion engine is passed via the device for the partial oxidation of fuel. On the other hand, it is necessary to pass sufficient fuel via this device to ensure that the effects of reduction of the soot emissions can be detected. It is therefore preferred if at least 1% by volume, in particular at least 3% by volume, particularly preferably at least 5% by volume, and most preferably about 10% by volume of the fuel, is passed via the device for the partial oxidation of fuel.

The partial oxidation of hydrocarbons to produce oxygen-containing hydrocarbons is a known process and can be accomplished in various ways. By way of example, the following oxidation reactions are suitable:

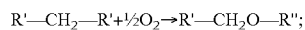

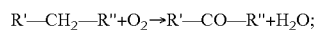

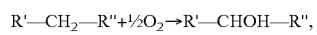

where the R'—CH$_2$—R" compound forms a constituent of conventional diesel. Where conventional diesel or diesel fuels are mentioned above, these are to be taken to include mineral diesels according to the definition of European Standard EN 590, Automotive Fuels-Diesel-Requirements and Test Methods. R' and R" are arbitrary alkyl radicals. Other reactions which are possible involving oxygen radicals with hydrocarbons from diesel are the following:

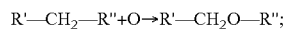

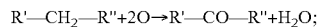

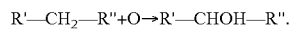

The oxygen radicals can be produced in various ways within the scope of the invention. However, oxygen radicals are preferably produced by means of plasma discharge, in a fuel reformer, which can contain a catalyst, or indirectly by means of an ozonizer (through the formation of O$_3$).

Thus, in the case of ozonolysis, aromatics react with ozone, for example, to form glyoxal.

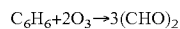

Within the scope of the present invention, it is consequently preferred if the device for the partial oxidation of fuel (2) has a device for plasma discharge, a fuel reformer, in particular one having a catalyst, or an ozonizer. Suitable devices for plasma discharge are described in DE 10 2008 062 417 A1 or DE 60 2004 004 728 T2. DE 10 2006 043 128 A1, EP 1 535 660 A1 or DE 11 2008 001 062 T5 describe reformers. In "Novel process to evaporate liquid fuels and its application to catalytic partial oxidation of diesel", *Journal* of *Power Source*, 165 (2007) 210-216, the authors describe a reformer system for evaporating and oxidizing fuels with the aim of obtaining as much hydrogen and carbon monoxide as possible. "*Externe Nacheinspritzung zur Regeneration von Dieselpartikelfiltern*", *Motortechniche Zeltung*, 5/2004, 354-361 describes a system in which, for active regeneration of a soot-laden diesel particle filter, an exothermal reaction is produced by complete oxidation of the fuel over an oxidation catalyst by means of metered diesel using an external fuel injector in order to regenerate the diesel particle filter (DPF). The formulation of the catalyst used generally comprises Pt in combination with Pd. The aim of all these systems is to oxidize the fuel as completely as possible.

In contrast, it is the aim of the present invention to obtain only a partial oxidation of the fuel by moderate control of the systems described (lower temperatures and/or less active catalysts). That is to say that, in principle, the fuel reformers described above, devices for plasma discharge etc., can be used within the scope of the present invention, but they must be operated at lower temperatures and/or fitted with less active catalysts than is described in the prior art.

Within the scope of the present invention, it is furthermore preferred if oxidation in the device is controlled in such a way that the partially oxidized fuel obtained has an oxygen content of at least 0.5% by weight, in particular at least 2% by weight, and particularly preferably at least 5% by weight, and most preferably at least 10% by weight, after passing through the device. On the other hand, the oxygen content after passing through the device should not be too high since this results in excessive fragmentation of the diesel constituents into small decomposition products, significantly reducing the ignition temperature of the product compared with unoxidized diesel. It is therefore preferred if the oxygen content of the partially oxidized fuel is no more than 30% by weight, in particular no more than 15% by weight.

The device for the partial oxidation of fuel (2) is preferably designed in such a way that ethers, aldehydes, ketones, carboxylic acids and/or alcohols are produced from the saturated and/or unsaturated hydrocarbons in the fuel during its operation. Care should be taken in the management of the oxidation reaction that as few as possible extremely combustible oxidation products (e.g. hydrogen) are formed. Moreover, care should be taken to ensure that the reaction products formed can still mix easily with the hydrocarbons of the diesel fuel. The reason is that the oxidation products are admixed to the diesel fuel before the latter is burnt, or must be introduced into the combustion chamber before or simultaneously with said fuel. If the oxidation products contain too high a proportion of highly combustible gases, this can lead to premature ignition in the combustion process, resulting in less favourable combustion of the diesel fuel injected.

In a preferred embodiment, the device for the partial oxidation of fuel (2) is in fluid connection with a mixer unit (3), which, for its part, is in fluid connection with the fuel tank (1) and the diesel internal combustion engine (4). The fluid connection preferably comprises lines or direct links between the mixer unit and the fuel tank and/or the diesel internal combustion engine. A device of this kind is illustrated schematically in FIG. 1.

Figure 2:
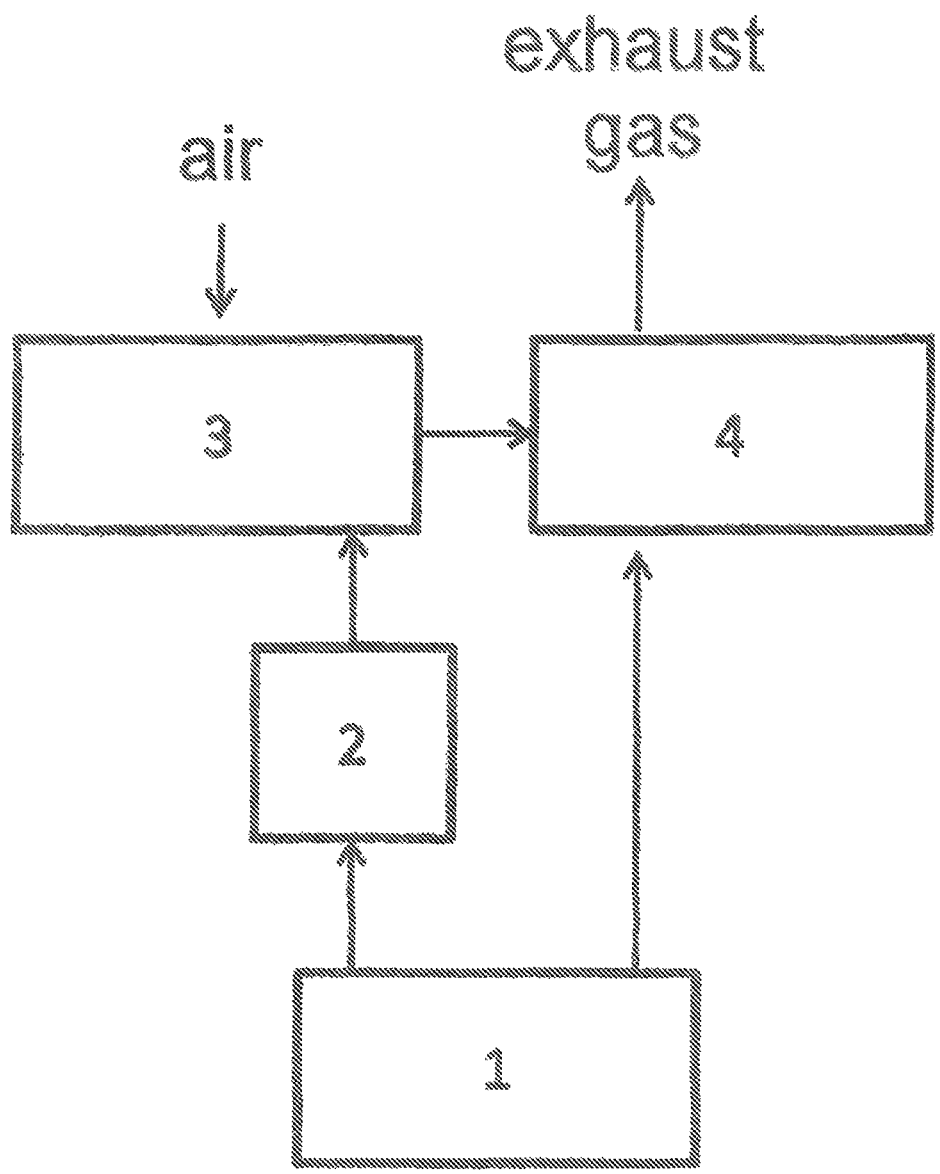
FIG. 2 describes an alternative illustrative embodiment of metering via the air path. For this purpose, fuel is taken from the fuel tank (1) and oxidized in the reformer (2). During the partial oxidation, highly volatile oxygen-containing hydrocarbons, that is to say including ether, are formed to some extent. These can then be fed to the intake air path in a mixer unit (3) and can thus enter the diesel internal combustion engine (4).

In another preferred embodiment, which is an alternative thereto, the device for the partial oxidation of fuel (2) is in fluid connection with a mixer unit (3) which, for its part, is in fluid connection with the diesel internal combustion engine (4) and has a device for drawing in air. A device of this kind is illustrated schematically in FIG. 2. Accordingly, the partially oxidized fuel, after passing through the device for partial oxidation (2), is mixed with air drawn in by the diesel internal combustion engine (4) before the mixture of air and partially oxidized fuel is introduced into the diesel internal combustion engine (4). Introduction preferably takes place before compression and injection of the diesel fuel into the diesel internal combustion engine.

The mixture of air and partially oxidized fuel can also be introduced simultaneously with or shortly before the injection of the fuel into the combustion chamber, wherein the existing air in the combustion chamber may already have been heated by compression. In this case, it is preferred if the mixer unit (3) is in fluid connection with the diesel internal combustion engine (4) in such a way that the mixture of partially oxidized fuel and air is introduced into the combustion chamber or chambers, being mixed with the unmodified fuel in the process. In this case, the mixture is preferably introduced in such a way that the mixture of oxidized fuel, unmodified fuel and air is as homogeneous as possible.

Within the scope of the present invention, it is furthermore preferred if the device according to the invention has a soot particle filter, which is in fluid connection with the diesel internal combustion engine (4) and via which the combustion exhaust gases produced by the diesel internal combustion engine (4) are discharged into the surroundings.

Another aspect of the present invention relates to the use of a partially oxidized diesel fuel in a propulsion device, as described above, to reduce soot emissions. Within the scope of this use, it is particularly preferred if the composition of partially oxidized diesel fuel, unoxidized diesel fuel and air is set in such a way that a reduction in soot formation is achieved already in the combustion chamber. It is furthermore expedient to set the composition of partially oxidized diesel fuel, unoxidized diesel fuel and air for combustion in such a way that the soot formed contains oxygen atoms chemically bonded therein, ensuring that the soot can be broken down to form carbon dioxide at lower burn-off temperatures in a subsequent diesel particle filter. The reference point for determining whether the soot can be broken down to form carbon dioxide at lower burn-off temperatures is soot obtained in the combustion exclusively of diesel fuel that has not been partially oxidized.

Another aspect of the present invention relates to a method for operating a diesel internal combustion engine which has the following steps:
  a) supplying a diesel fuel,
  b) partially oxidizing at least some of the diesel fuel,
  c) mixing an unmodified portion of the diesel fuel with the partially oxidized diesel fuel to form a mixture,
  d) introducing the mixture from c) into a combustion chamber and carrying out a compression ignition combustion process.

As an alternative, the present invention likewise relates to a method for operating a diesel internal combustion engine which has the following steps:
  a) supplying a diesel fuel,
  b) partially oxidizing at least some of the diesel fuel,
  c) mixing the oxidized portion of the diesel fuel with air in a mixer unit,
  d) introducing the mixture from c) into a combustion chamber, supplying unmodified diesel fuel and carrying out a compression ignition combustion process.

In both methods, partial oxidation expediently takes place within the diesel internal combustion engine, i.e. not outside the latter in a separate apparatus.

Within the scope of the method described above, it is preferred if the mixture is introduced into the combustion chamber in step d) in such a way that a substantially homogeneous mixture is formed with the diesel fuel supplied.

The method can furthermore be configured advantageously if the oxidized hydrocarbons obtained from aliphatic hydrocarbons in the course of oxidation are preferably in the form of ethers, aldehydes, ketones, carboxylic acids and alcohols. As a particularly preferred option, longer-chain aliphatic hydrocarbons are converted into partially oxidized smaller hydrocarbons in the course of the method. As an alternative or in addition, the method can also be configured in such a way that oxidized hydrocarbons are formed from aromatic hydrocarbons in the course of oxidation.

By means of the propulsion device described above, the soot particles produced within the combustion process have a higher activity than soot from conventional diesel fuels and hence have a lower soot burn-off temperature in the subsequent soot particle filter. Without the applicant being able to present a particular theory as evidence, it is assumed that introducing oxygen into the fuel mixture leads to oxygen being incorporated into the soot which is formed, owing to the partial oxidation of diesel hydrocarbons. By lowering the soot burn-off temperature, this oxygen facilitates subsequent conversion of the soot particles into carbon dioxide.

Example

On an engine testbed, soot was collected as a combustion residue from a mixture of mineral diesel and diesel containing 35% by weight of dipropylene glycol dimethyl ether. The oxygen content of the mineral diesel was about 0%, while that of the mixture was about 11%.

The burn-off temperature of the soots was determined with the aid of a thermogravimetric analyser (TGA) in synthetic engine exhaust gas containing 5% oxygen. For the soot from pure mineral diesel, a burn-off temperature of 610° C. was determined, while measurement of the soot from the diesel containing dipropylene glycol dimethyl ether additive gave a burn-off temperature of 540° C. The mixture thus has a burn-off temperature 70° C. lower than soot from pure diesel.

The TGA burn-off temperatures were determined from the maximum for the $CO_x$ emissions and therefore did not represent the absolute values for the burn-off temperatures in the particle filter. However, the results from the TGA experiment are relatively transferable to the particle filters.

The propulsion device according to the invention and/or the methods according to the invention for operating a diesel internal combustion engine are preferably used in vehicles and, particularly preferably, in commercial vehicles.

The invention claimed is:

1. A propulsion device for vehicles, comprising:
a device for partial oxidation of fuel;
a fuel tank for holding the fuel; and
a diesel internal combustion engine, the device for partial oxidation being in fluid communication with the fuel tank and the diesel internal combustion engine, so that a first portion of the fuel is delivered to the device for partial oxidation, a second portion of the fuel bypasses the device for partial oxidation, and the first portion of the fuel is partially oxidized in the device for partial oxidation before combustion in the diesel internal combustion engine to produce a partially oxidized fuel having an oxygen content of at least 0.5% by weight and no more than 30% by weight.

2. The propulsion device of claim 1, wherein the device for partial oxidation of fuel includes one of a device for plasma discharge, a fuel reformer, and an ozonizer.

3. The propulsion device of claim 1, wherein the device for partial oxidation of fuel includes a fuel reformer with a catalyst.

4. The propulsion device of claim 1, wherein the device for partial oxidation of fuel produces ethers, aldehydes, ketones, carboxylic acids, and alcohols.

5. The propulsion device of claim 1, further comprising a mixing unit in fluid connection with each of the fuel tank, the diesel internal combustion engine, and the device for partial oxidation of the fuel so that the partially oxidized fuel is mixed with the second portion of the fuel in the mixing unit to produce a mixture and the mixture is introduced into a combustion chamber of the diesel internal combustion engine.

6. The propulsion device of claim 1, further comprising a mixing unit having a device for drawing in air, the mixing unit being in fluid connection with each of the diesel internal combustion engine and the device for partial oxidation of fuel.

7. The propulsion device of claim 6, wherein the mixer unit is in fluid connection with the diesel internal combustion engine so that the mixer unit produces a mixture of the partially oxidized fuel and air, which is introduced into a combustion chamber of the diesel internal combustion engine and mixed in the combustion chamber with the second portion of the fuel to form a homogeneous mixture.

8. The propulsion device of claim 1, further comprising a soot particle filter connected to the internal combustion engine.

9. A vehicle having a propulsion device of claim 1.

10. A use of a partially oxidized diesel fuel in a propulsion device according to claim 1,
wherein a reduction of soot emissions occurs in a combustion chamber of the diesel internal combustion engine.

11. The use of partially oxidized fuel of claim 10, wherein the partially oxidized diesel fuel is mixed with unmodified diesel fuel and air such that soot formed during combustion has a higher reactivity than soot obtained using unmodified diesel fuel and air.

12. A method for operating a diesel internal combustion engine, comprising the steps of:
supplying a diesel fuel;
partially oxidizing at least some of the diesel fuel to produce an oxidized portion of the diesel fuel;
mixing the oxidized portion of the diesel fuel with unmodified diesel fuel in a mixer unit to produce a mixture;
introducing the mixture into a combustion chamber of the diesel internal combustion engine; and
carrying out a compression ignition combustion process with the mixture.

13. The method of claim 12, wherein the steps of mixing and introducing the mixture are performed in such a way that a substantially homogeneous mixture is formed in the combustion chamber.

14. The method of claim 12, wherein the oxidized hydrocarbons are formed from aliphatic hydrocarbons during the step of partially oxidizing.

15. The method of claim 14, wherein the oxidized hydrocarbons include at least one of ethers, aldehydes, ketones, carboxylic acids, and alcohols.

16. The method of claim 12, wherein the oxidized hydrocarbons are formed from aromatic hydrocarbons during the step of partially oxidizing.

17. A method for operating a diesel internal combustion engine, comprising the steps of supplying a diesel fuel;

partially oxidizing at least some of the diesel fuel to produce a partially oxidized fuel having an oxygen content of at least 0.5% by weight and no more than 30% by weight;

mixing the partially oxidized fuel with air in a mixer unit to produce a mixture;

introducing the mixture into a combustion chamber of the diesel internal combustion engine; and introducing unmodified diesel fuel to the combustion chamber and carrying out a compression ignition combustion process with the unmodified diesel fuel and the mixture.

18. The method of claim 17, wherein the partially oxidized fuel includes oxidized hydrocarbons, which are formed from aliphatic hydrocarbons during the step of partially oxidizing.

19. The method of claim 18, wherein the partially oxidized fuel includes oxidized hydrocarbons, which include at least one of ethers, aldehydes, ketones, carboxylic acids, and alcohols.

20. The method of claim 17, wherein the partially oxidized fuel includes oxidized hydrocarbons, which are formed from aromatic hydrocarbons during the step of partially oxidizing.

21. The propulsion device of claim 1, wherein the partially oxidized fuel produced by the device for partial oxidation has an oxygen content of at least 10% by weight and no more than 15% by weight.

22. The method of claim 12, wherein the oxidized portion of the diesel fuel produced in the step of partially oxidizing has an oxygen content of at least 0.5% by weight and no more than 30% by weight.

23. The method of claim 22, wherein the oxidized portion of the diesel fuel produced in the step of partially oxidizing has an oxygen content of at least 10% by weight and no more than 30% by weight.

24. The method of claim 17, wherein the partially oxidized fuel produced in the step of partially oxidizing has an oxygen content of at least 10% by weight and no more than 30% by weight.

* * * * *